United States Patent [19]
LeNir

[11] 4,068,615
[45] Jan. 17, 1978

[54] CONTROL FOR WIRE COATING LINE

[75] Inventor: Victor Louis LeNir, Montreal, Canada

[73] Assignee: Northern Telecom Limited, Montreal, Canada

[21] Appl. No.: 740,354

[22] Filed: Nov. 10, 1976

[30] Foreign Application Priority Data

Nov. 1, 1976 Canada .................................. 264575

[51] Int. Cl.² ............................................ B05C 11/00
[52] U.S. Cl. ............................................ 118/6; 118/9;
    118/68; 118/405; 118/DIG. 18; 118/DIG. 22;
    425/113
[58] Field of Search ....................... 118/4–9,
    118/68, 404, 405, DIG. 18, DIG. 22; 425/113,
    114, 131.1, 145

[56] References Cited

U.S. PATENT DOCUMENTS

| B 455,775 | 1/1975 | Dembiar ............................ 425/113 X |
| 2,369,858 | 2/1945 | Ryan ........................................ 118/6 |
| 3,256,562 | 6/1966 | Heard, Jr. ........................... 118/405 X |
| 3,295,163 | 1/1967 | Bachus ................................... 118/68 |
| 3,502,752 | 3/1970 | Brown ............................... 425/113 X |
| 3,564,661 | 2/1971 | Atwell ............................... 425/113 X |
| 3,635,620 | 1/1972 | Brown .................................. 425/113 |
| 3,689,747 | 9/1972 | Di Millia et al. ................... 118/9 X |
| 3,746,575 | 7/1973 | Arnaudin, Jr. et al. ............. 118/9 X |
| 3,899,384 | 8/1975 | Kelly .................................. 118/405 X |
| 3,986,477 | 10/1976 | Bigland ................................ 118/6 |

*Primary Examiner*—James Kee Chi

*Attorney, Agent, or Firm*—Shlesinger, Arkwright, Garvey & Dinsmore

[57] ABSTRACT

A control is provided for a wire coating line which includes means for driving wire along a path at controllable speed while coating it with plastic extruded at a controlled rate and temperature, and cooling means are located at a controllable distance from the coating means to solidify the plastic. The controllable factors affect both the capacitance and diameter of the wire produced. The control allows the line to be run in accord with stored digital values for the matters to be controlled. Closed loop control is provided because the relevant factors of line operation are measured, the analogue measurements converted to digital values and compared with the stored values to produce a control signal which has the effect of reducing the differences between a desired and measured line condition as represented by the digital values compared. Closed loop control is also provided for control of the line to produce desired capacitance or diameter values in the coated wire. Whichever of capacitance or diameter is used as the basis for line control is measured and provided as a digital value to the control. This digital value is compared to a stored digital value representative of the desired capacitance or diameter. The results of the comparison is used to update the stored digital value for an operating condition of the line so that the parameter is altered to provide an operating condition which brings the capacitance or diameter closer to the desired value.

15 Claims, 5 Drawing Figures

CONTROL FOR WIRE COATING LINE

This invention relates to means for using a computer to control the operation of a high speed wire insulating line to produce insulated wire of relatively consistent coaxial capacitance and/or diameter.

In drawings, which illustrate a preferred embodiment of the invention:

Figure 1:
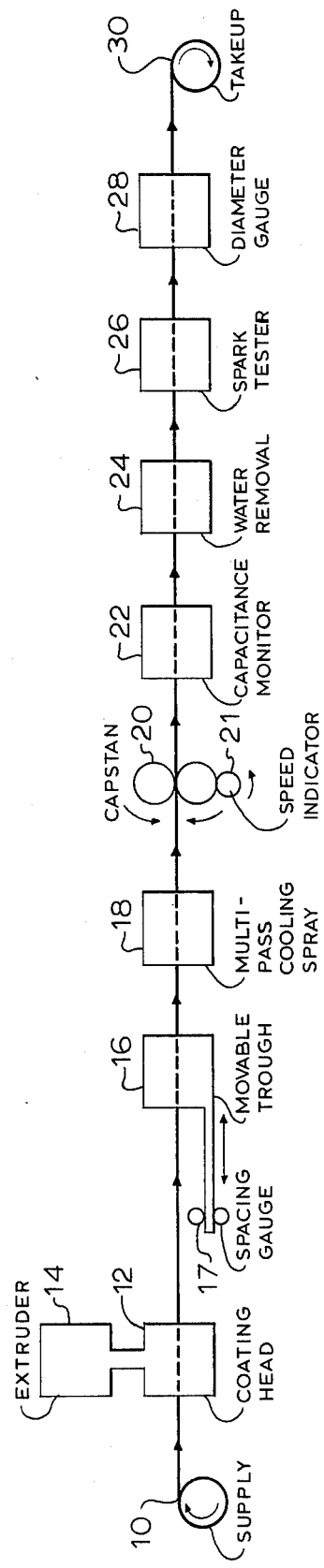
FIG. 1 is a schematic view of a wire insulating line.

FIG. 1 shows a typical wire coating line. The supply 10 would provide, as required, wire of diameter and metallurgical properties achieved by wire drawing, annealing etc. well known to those skilled in the art. The wire is carried through the coating head 12 of one or two extruders. One extruder is used where a single type of insulation layer is to be provided. This may be a "foamed" type of plastic insulation or solid. Many times it is desired to provide the foamed type of insulation supplied by one extruder covered by a harder skin of a different and non-foamed plastic material. In this alternative two extruders are used. The methods of extrusion and coating are well known to those skilled in the art. An extruder is shown in more detail in FIG. 2. Cooling means 16 preferably a water trough (shown in cross-section FIG. 3) is provided to receive the wire travelling out of coating head 12. The trough provides a water bath for the travelling, coated wire of water sufficiently cooler than the solidification point of the plastic coating or coatings to cause it or them to solidify. As indicated schematically and as discussed hereafter, the spacing of the water trough from the coating head is adjustable and controllable and its spacing from the extrusion head is indicated by guage 17. The coated wire from the movable trough is next finally cooled in cooler 18 by means well known to those skilled in the art, preferably by a device commonly known as a multipass cooling spray, wherein the coated wire is caused to make multiple passes through a chamber while subjected to a cooling water spray. The coated wire from the cooler 18 is driven by a capstan 20. The capstan 20 forms the main wire drive and controls the speed of the wire along its entire path from supply 10 to take up 30. Thus the supply of wire 10 and the wire take up 30 are slaved to supply and take up wire at the speed determined by the capstan 20. The wire from the capstan has its capacitance tested at capacitance monitor 22, by means well known to those skilled in the art, and the wire travels through a dryer or equivalent water removal device 24. From the water removal device the wire preferably is tested at 26 for pin holes by a spark tester 26. The wire is next passed through a device 28 for measuring its diameter, preferably an optical diameter guage. The coated wire, measure for capacitance, pinholes and diameter is wound on take up means 30.

Figure 2:
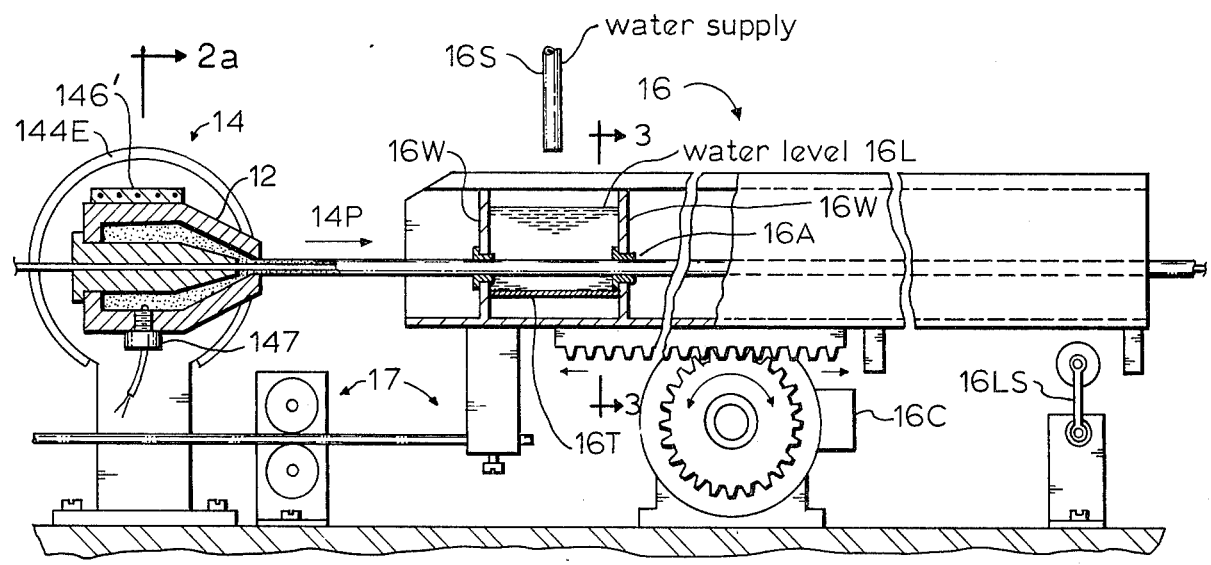
FIG. 2 and 2a are more detailed, although still schematic views of an extruder coating head and water trough forming one of the elements of FIG. 1.
Figure 2A:
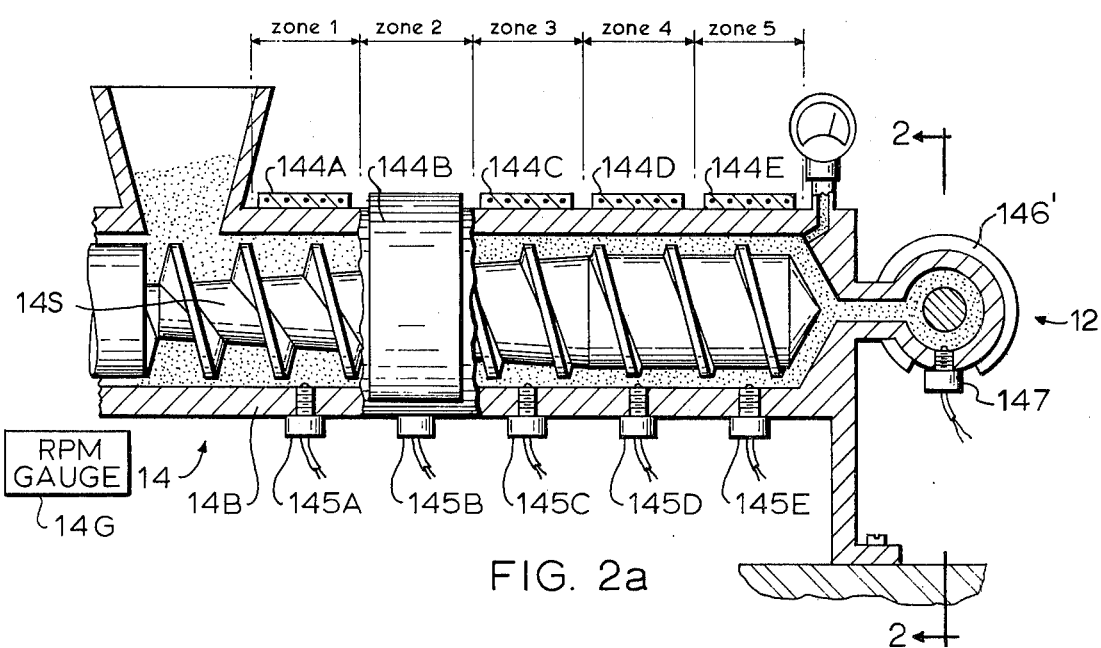
Figure 3:
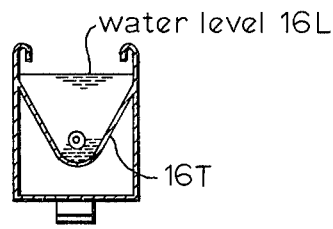
FIG. 3 is a cross-section along the line 3—3 of FIG. 2.

In FIG. 2 an extruder 14 and the adjacent water trough 16 are shown in more detail. The extruder comprises a longitudinally extending body 14B wherein a rotatable screw 14S feeds material from a hopper to an extrusion head 12 where the molten plastic is coated on a wire following the path 14P. The R.P.M. or rotational speed of the screw determines the rate of supply of molten plastic to the head. A guage, shown schematically as 14G measures the R.P.M. of the screw for analogue control purposes and also, in accord with the invention provides a control signal, indicative of RPM, which is used by the computer in its control function. Five Zones numbered 1, 2, 3, 4, 5, are indicative of heating zones in the molten plastic. For each of these zone heaters (144A - 144E respectively) are provided to heat the molten plastic. Each heater is provided with a corresponding sensor (145A - 145E respectively) connected to exert analogue control on its corresponding heater. As hereinafter explained, each sensor may be connected to supply analogue temperature indicative signals for use by the computer. However it is found satisfactory, with present processes, to provide such signals to the computer only from zone 5 (sensor 145E) in the control of diameter or capacitance. However it will be noted that the zones other than 5 have a lesser effect usually in a degree diminishing with their distance from the output end of the extruder. Thus it may in some applications be desireable to also provide signals to the computer from zones 4 and 3 (as well as zone 5) and (sensors 145D and 145C) and controls from the computer to the heaters for zones 4 and 3 (as well as 5). The coating head is provided with a heater 146' and a corresponding sensor 147 for control. The general operation of such an extruder is conventional and well known. The plastic, depending on the type of coated wire to be formed may be solid or of the forming type where gas bubbles are formed in the coating. In the foamed plastic coating the size of the bubbles affects the capacitance and the wire diameter (the larger the bubbles, the smaller the coaxial capacitance and the larger the diameter). It is found that, with present wire types, the bubble size is affected by the temperature at zone 5, (and to a lesser extent by zones 4,3 usually in descending order), adjacent the head, much more than by the temperature in the other four zones or even in the head. The extruder RPM when increased increases the amount of plastic supplied and also, due to the viscosity of the melt increases the mechanical heat supplied thereto, reducing the amount of heat which must be supplied by the heaters. The effects of increased and decreased extruder RPM are complex and the resultant effects particularly with foamed plastic on coaxial capacitance and diameter of the coated wire must be calibrated for the specific product being produced and the results used to determine the mode of control of extruder RPM both by the conventional analogue means and by the computer. Where uncoated foamed insulation, or solid insulation is provided one extruder is used. Where foamed insulation with a hard skin is to be placed on the wire two extruders are used with their heads immediately adjacent and the foam coated on the wire first followed by the skin. The control criteria for the foamed plastic extruder are generally more critical than for the skin insulation.

Cooling means 16 are provided for solidifying the plastic at a predetermined spacing from the extruder head or heads. The size of the bubbles formed by foamed plastic are directly affected by the line speed of the wire and the spacing between the cooling means and the head of the extruder which extrudes the foamed plastic. The spacing between the cooling means and this extruder head tends to affect the capacitance and diameter in the sense that an increase in spacing allows increases in the bubble size increasing the diameter and reducing the capacitance.

The specific form of the cooling means described hereafter is well known.

The preferred form of cooling means 16 is a water trough 16T having ends walls 16W with apertures 16A for the wire to go through with narrow clearance. Water from a supply 16S is supplied at a rate to maintain water between walls 16W at level 16L above the wire. The water temperature is not critical as long as it is low enough to cause the plastic to solidify. A spacing control 16C is shown for controlling the spacing S from the extruder head and a sensor 17 determines this spacing both to provide a visual indication and to provide an analogue signal for use by the computer.

It will be noted that, since greater melt temperature in zone 5 of a foamed plastic extruder tends to decrease the capacitance as does greater trough spacing, increase of melt temperature will reduce the excursion of the water trough away from the extruder head and conversely that reduce melt temperature will reduce the excursion of the water trough toward the extruder head. Thus the control melt temperature may be used to limit trough excursions to limits desired and this is used, as hereinafter described in the computer control.

Limit switches 16LS may be used to control or indicate travel of the trough to its permitted limits.

It will be noted that trough spacing interacts with line speed in that either increased trough spacing or decreased line speed both tend to increase diameter and reduce capacitance while either decreased spacing or increased line speed decrease diameter and increase capacitance. Thus the computer control, as hereinafter described has flexibility in determining the extent that capacitance or diameter is controlled by control of line speed or trough spacing along with other matters to be discussed.

Prior to this development the criteria for operating the above line to produce wire to desired insulation value, diameter and coaxial capacitance have been achieved by analogue controls which may be set to operate at desired values. As previously described among those controls of principal interest to the control of coaxial capacitance and wire diameter are the speed determined at the capstan, the extrusion speed in the extruder or extruders, and the temperatures in the extruder at the various locations indicated in FIG. 2 and at the coating head. Prior to this invention the analogue control maintained the operating conditions of the line as closely as possible. The achievement on the line of the required capacitance and diameter values was monitored by guages which indicated the values determined at elements 22 and 28 respectively. Control of line speed, extrusion speed, trough spacing and/or melt temperature, all of which affect the capacitance and of other operating criteria having a lesser effect have, prior to this invention, involved delays, and wide variations in capacitance values; and correction of the deviation from the desired capacitance criteria have depended both in speed and degree in the personal skill of the operator in adjusting, the correct controls in the correct amount. Similarly control of line speed and extrusion rate, both of which affect the diameter have been adjusted by the operator with success and speed dependant on his personal skill to crrect for deviations in the diameter value.

The invention provides that in addition to the analogue controls, manual adjustments and visual monitoring described above a computer control which may be used to supervise and control the analogue controls and to replace the manual controls partially or to the extent desired and for part or to the proportion desired of the operating time of the line. The computer is designed to provide on selection, the types of coated wire for which it has been programmed and for each selected one of such types to provide digital values indicative of the desired settings for:

a. line speed (with acceleration or steps to speed)

b. extrusion rate (as exemplified by extruder screw RPM)

c. trough spacing d. melt temperature Means are provided for converting these digital values to analogue signals so that when the computer is connected to control the line analogue values are used to set the operating criteria for the devices in question. The computer is connected to receive in digital form, at predetermined intervals the capacitance and diameter measurements provided by analogue devices 22 and 28 respectively. The computer is also connected to receive in digital form, at predetermined intervals the actual values of trough spacing and melt temperature, thus the computer receives reports on the parameters (a) (b) (c) (d) described above. The computer is programmed to compare the digital values of measured capacitance and measured diameter with stored values determined for the type of coated wire being produced. The computer is programmed as a result of such comparisons and suitable algorithms, to provide digital signals to alter the values of (a) (b) (c) and (d), to bring the product within the desired capacitance or diameter limits. The computer is thus designed to monitor the correspondence between the digital values for (a) (b) (c) and (d) respectively with corrected corresponding preset values and to provide in each case analogue correction signals accordingly. These correction signals are used to reset the analogue controls. The system allows considerable flexibility in that all apparatus (a) (b) (c) (d) above may be adjusted in accord with the capacitance measurements (as distinct from diameter) or line speed and extruder rate may be adjusted in accord with diameter measurements instead of capacitance. Alternatively some of the criteria (a) (b) (c) or (d) above may be operated by computer while others are on analogue or manual control. The system may be provided with safe guards, and designed so that malfunction of the computer may merely result in its disconnection from the line which may then be operated by the manual and analogue methods while the computer is being repaired. The computer is designed to store permissible limits for any of the settings it is designed to control. Thus if the incremental change in the settings called for would go outside such limits for the physical apparatus involved (signifying that it is beyond the capacity of the equipment or that it is undesirable or inconsistent with the other parameters of the line), the computer may be designed to shut down the line or remove itself from service and give an indication that inspection and correction is required. Another safeguard is that the computer may be programmed to provide that, in the event that a required operating condition is not reached within a predetermined interval from its request by the computer, the computer is designed to indicate a malfunction on the line and to call for whatever other action desire (i.e. shutting down the line) as is necessary. The computer may be designed to simultaneously monitor and control other criteria of the line than those specifically discussed. The computer may be designed to store criteria for a large number of coated wire types. The computer may control as many lines as desired, depending upon the type of computer and the nature of the software used. It is found that with a computer controlling the criteria listed as (a) (b) (c) and (d) that coaxial capacitance or diameter variation in a product may be reduced greatly over the variation encountered when manual and analogue controls only are used.

Prior publications have referred to research and development in the area of computer controlled coated wire lines. Such publications as known to applicant are as follows:

1. "Capacitance Relationships in Filled Telephone Cables and Equilibrium Prediction from Water Immersion Tests" — by J. A. Olszewski, Proceedings 24th International Wire & Cable Symposium.
2. "Automatic Process Control in the Insulating of Telephone Cables" — by E. Kertscher, Wire Journal, January 1976.
3. "Computer Control of Insulation Extrusion Line" — by S. Yumoto, K. Masuda, K. Matsubara, T. Hiroyama, Wire Journal, September 1973.
4. "One Approach to Automating Plastics Machines" — by H. E. Harris, SPE Journal, May 1976.
5. "Process Control for extrusion of foam communications cable." — by Charles F. Steeber — Wire & Wire Products, October 1971.

The disclosure in the above materials does not provide sufficient detail to disclose the methods used. However, so far as can be determined, the mode of operation of these devices is different from that described above and they do not appear to have the advantages accruing from applicant's system.

Figure 4:
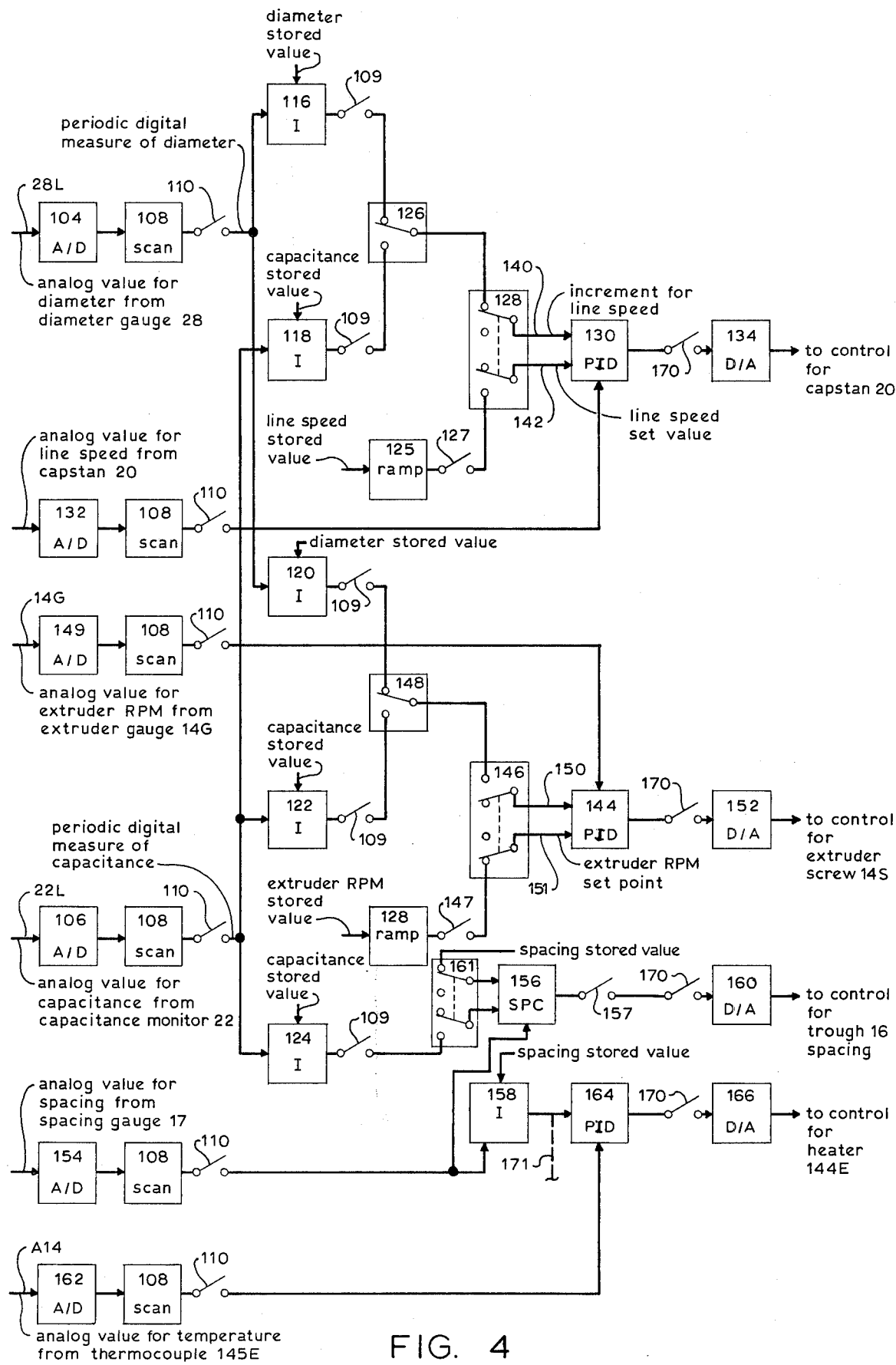
FIG. 4 shows the control block diagram.

In FIG. 4 the arrangement of the control operations digitally performed at the computer is indicated.

The following conventions are used in FIG. 4:
A/D means an analogue-to-digital convertor
D/A means a digital-to-analogue convertor
Operating blocks have been labelled to indicate the preferred (although not the only method of operation). This labelling is as follows:
I: Integral
PID: Proportional Integral Derivative
SPC: Set Point Control
SP: Set Point Blocks 108 marked 'scan' indicate that at periodic intervals the computer scans and stores the value at the output of the A/D convertor to which the block 108 is connected. The computer may of course be designed to display the scan results.

Switches 110, 109, 126, 148, 147, 157, 127 and 170 do not necessarily represent switches but represent the fact that in accord with the choices of operating modes available information may be supplied or not over the paths connected by the switch representation.

Although other computers may be used I prefer to use the Computer, Model Fox 2/30 manufactured by The Fox boro Company of Fox boro, Mass. U.S.A.

As indicated lines 28L and 22L are connected respectively to receive from diameter guage 28 and capacitance monitor 22, signals representing analogue values for the diameter and coaxial capacitance respectively. The two sets of analogue signals are converted respectively at analogue-to-digital convertors 104 and 106 respectively into digital values. Five operations blocks 116, 118, 120, 122 and 124 are indicated. In blocks 116 and 120 the digital diameter value obtained from convertor 104 is compared with a stored value for the diameter provided by the computer memory on selection of the type of coated wire to be made. The block 116 or 120 is designed to operate in accord with an algorithm to provide a digital signal indicative of the sense and amount of the correction required to bring the actual value of diameter into correspondence with the stored value. The algorithm used will be a matter of design choice. I prefer to use the algorithm $$\Delta M = (\Delta t/Tr) E$$

where $\Delta M$ is the digital correction signal
$\Delta t$ is the interval between scans
$Tr$ is a constant
$E$ is the digital value of the difference between stored and measured diameter values It will be noted that the sense of the correctional signal $\Delta M$ will be opposite at the outputs of blocks 116 and 120 because (as hereinafter explained) the output of block 116 is used to alter the line speed, where an increase in line speed decreases the diameter whereas the output of block 120 is used to alter the extrusion rate where an increase in extrusion rate increases the diameter.

Similarly the digital value for capacitance is supplied from convertor 106 to operational blocks 118, 122 and 124 for comparison with a computer — stored value for capacitance again obtained from the computer storage when the types of coated wire is selected. These operational blocks preferably operate in accord with the same algorithm as blocks 116 and 120 noting that Tr may be different (and in fact may be different for each block) and that E would now represent the digital value of the difference between stored and measured capacitance values.

It will be noted that the sense of the correctional signal $\Delta M$ will be opposite at the outputs of blocks 118 on the one hand and blocks 122 and 124 on the other. This is because (as hereinafter explained) the output of block 118 is used to alter the line speed where an increase of line speed increases the capacitance whereas the output of block 122 is used to alter the extrusion rate where an increase in extrusion rate decreases the capacitance and the output of block 124 is used to alter the trough spacing and melt heating an increase in either of which decreases the capacitance.

To start the line the computer provides a stored value for line speed and is programmed to cause graded increase thereof as indicated by the ramp 125. Moreover the program represented schematically by ramp 125 may be designed to have the line initially "ramp" up to a low speed to allow observations of line operating conditions before again ramping up to full operating condition. The programmed values for line speed may be communicated (when the optional connection represented by the arm of switch 127 is closed) to block 130. Thus, during start-up, block 130 is designed to receive the computer stored values for capstan or line speed and also to receive the measured value reported from a speed guage on capstan 29 converted by analogue to digital convertor 132 and periodically scanned by the computer and supplied to block 130 over a closed connection 110. The block 130 (operating like blocks 144 and 164) is designed to operate in accord with an algorithm to produce a signal to cause the capstan control (to increase oe decrease wire speed) via digital-toanalogue convertor 134 with the intervening connection 170 closed. The block which I prefer to use is a Proportional-Integral-Differential (PID) block obtainable from The Foxboro Company, referred to above and operating in accord with the algorithm:

$$\Delta M = \frac{100}{PB}\left[E + \frac{\Delta t}{60\ Tr} E - \frac{60\ Td}{\Delta t}(\Delta B)\right]$$

where PB, Td, Tr are constants, E is the difference between measured and 'stored' values and B is the measured value and ($\Delta$ B) the second order derivative thereof.

$\Delta t$ is the interval between scans $\Delta M$ is the signal to digitally indicate the desired increase or decrease of capstan speed for conversion to an analogue incremental signal by digital to analogue convertor 134.

It will be noted that in accord with the preferred embodiment of the invention the controls for: capstan speed 20, the RPM of extruder screw 14S, trough spacing and heater 144E are designed to operate in accord with incremental signals to incrementally alter their values, hence the blocks 130, 144, 164, (and 156 preferably using a different algorithm) are designed to supply such incremental signals. It is within the scope of the invention to select the obvious alternative of using controls for the above devices which act in accord with signals indicating the desired setting (as distinct from an incremental adjustment) and if the latter alternative is used the blocks 130, 144, 164, 156, are replaced by blocks which provide signals indicating the desired setting, per se instead of an incremental adjustment. Thus the capstan 20 may be brought to its designed speed with the ramp 127 providing the stored values to block 130 for comparison with the measured values from convertor 134 over the closed connection 110 to box 130. Thus closed loop control is achieved. The controls may then be set so that the wire speed, controlled by capstan 20 is controlled in accord with either the diameter or the capacitance of the wire running on the line. For this the connections indicated by block 228 are switched to the up position so that the connection from block 127 is open and the connection from block 126 to line 140 is closed. For control in accord with capacitance the connection indicated by connection block 126 will be in the down position so that the output of block 118, a digital signal in a sense to reduce the difference between stored and measured value for coaxial capacitance of the wire is supplied through blocks 126 and 128 to line 140 and thence to block 130. Lines 140 and 142 are shown as distinct because the first carries an incremental value and the second the desired value per se. The block 130 will be designed to handle each type of input. It will be obvious that the block 130 may be connected to receive both overall values and incremental values on the same "path" if the input signals are coded so that they may be distinguished and properly handled at block 130. In line with the capacitance control, with the connections as discussed, a measured capacitance value for the wire, from 22L through convertor 106 and across a closed connection 110 appearing at block 118 differing from the desired value stored in the computer, is used to provide an incremental signal over 126, 128, 140 to alter the stored value in block 130, which causes a consequent incremental signal to be sent by block 130 over a closed connection 170 to D/A convertor 134 to alter the line spped in a sense to reduce the capacitance differential measured at block 118. Thus a closed loop is provided. With the foamed insulation with or without skin covering, an increase and decrease in line speed increases and decreases the capacitance of the wire, respectively. Control of line speed is a possible but not a preferred method of controlling capacitance with foamed insulation. With solid insulation increased line speed (or decreased extruder speed) increases the capacitance of the coated wire produced. Control of line speed is used for control of the capacitance of coated wire with solid insulation.

If it is desired to control the line speed in accord with wire diameter once the line is running, connection 126 is altered to connect the output of block 116 through blocks 126 and 128 to block 130 along line 140. The block 116 therefore provides to the incremental adjustment (line 140) of block 130 a increment signal indicative of the correction to the stored value of line speed. (It being noted that an increase in line speed decreases the diameter and vice versa). The change in the stored value of line spped at block 130 will result in an incremental signal from block 130 over a closed connection 170 to convertor 134 to alter the value of line speed (capstan 20). The alteration in line speed varies the measured value of diameter supplied from line 28L, 104 closed connection 110 to block 116 so that closed loop is provided.

Capacitance and diameter are also affected, in the coated wire process by the rate of extrusion of plastic from the extruders. In the extruders in accord with the invention such rate is determined primarily by screw R.P.M. As shown the extruder RPM is controlled by a block 144 constructed like blocks 130 and 164 and connected to receive at one of its inputs a digital signal indicative of the screw RPM from gauge 14G over analogue to digital convertor 149 and a closed connection 110 to the block 144. If it is desired to have the extruder screw started by the computer, then the ganged connections indicated by block 146 are in the down position so that line 151 is connected to receive a valve for extruder screw RPM over closed connection 147. The ramp block 128 indicates that the computer may be programmed to bring the extruder RPM up to speed in at a controlled acceleration rate. As the extruder is brought up to speed, the measured values of extruder RPM are fed back over elements 14G, 149, 110, to 144 so that closed loop control is provided as the block 144 sends out incremental signals over 170 (closed) and 152 to correct the extruder RPM. When the extruder screw is operating at desired speed for wire production; it may be desired to run the extruder RPM in accord with the measured capacitance or measured diameter values. The connection block 146 is then switched to the "up" position as schematically indicated by the switches 146 so that absolute value line 151 is disconnected from ramp 129 and increment line 150 is connected to block 148. Block 148 allows connection "down" for capacitance control and "up" for diameter control. When down the capacitance 'stored' value is compared at block 122 with the measured capacitance value received from capacitance monitor 22L, A/D convertor 106 closed switch 110. The block 122 is designed to operate in accord with a similar algorithm to blocks 116 and 118 (the sense of the signals provided by these blocks having been previously discussed). The correctional incremental digital value from block 122 is supplied to line 150 to increment the stored value in block 144. Line 150 supplies increment values and line 151 absolute values as with the two lines to block 130. The incremental value from block 122 alters the stored value at block 144 in a sense to reduce the capacitance deviations from stored value. Block 144 compares its updated stored value from extruder RPM and with the measured value of extruder RPM supplied from guage 14G through block 149 (where it is converted to a digital signal) and over closed switch 110 to block 144. Block 144 compares its stored value and provides a digital signal which is sent over closed connection 170 to D/A convertor 152 to vary the extruder RPM in a sense to bring the coaxial capacitance to a value difference between the observed and measured value at block 122. The signal to D/A convertor 152 will also be in a sense to reduce the difference of measured and stored signals at block 144.

If it is desired to control extruder RPM in accord with diameter the connection indicated by block 146 is left in the "up" position and connection indicated by block 148 established in the "up" position so that the measure of diameter at guage 28 is supplied digitally from the A/D convertor 104 closed connection 110 to block 120 where it is compared with the computer stored value. Block 120 is designed to change the stored value at block 144 to cause the latter to send a control signal to alter the RPM of the extruder screw to vary the extrusion rate to bring the diameter closer to the set value. In general increase and decrease, in extruder RPM will increase and decrease, respectively, the value of coated wire diameter. The feed back at 144 from extruder RPM guage 14G is compared with the stored value updated over line 150 for closed loop control.

Control of the spacing of the cooling means (i.e. the water in trough 16) from the exit from the extruder head may be initially achieved by the analogue control. The position of the trough relative to the head is sensed by guage 17, converted to a digital value by A/D convertor 154, scanned by the computer and supplied to blocks 156 and 158 over a closed connection 110. The software is designed, in accord with the wire selected, to provide to blocks 156 and 158 stored values for the trough spacing for comparison with the measured values. To control the trough spacing in accord with capacitance the connection 110 will be closed to connect block 106 to block 124 and the connection 109 will be closed to connect block 124 to block 156. The result of comparing the capacitance set value with the measured capacitance from converter 106 at block 124 is a digital correcting signal supplied to block 156 to correct update the value for trough spacing stored therein. The block 156 is provided with connections indicated as a guaged switch. When the output of the block is connected over connections 157 and 170 the computer is programmed to establish the connection indicated by the switch 161 in the up position, and over this connection to provide a stored value for the trough spacing to block 156. Thereafter the computer breaks this connection and establishes the connection represented by the switch 161 in the down position so that the stored value of trough spacing may be incremented by the values from block 124 and for comparison with the measured value of trough spacing as supplied from block 154 over closed connection 108. The block 156 designed to provide a digital output signal to reduce the difference between the trough spacing and the value called for by the computer. Preferably the block 156 operates in accord with the algorithm:

$$\Delta M = K(R - B)$$

where $\Delta M$ is the digital correction signal
 $K$ is a constant
 $R$ is the computer stored value for trough spacing
 $B$ the measured value of trough spacing The digital output of block 156 supplied over closed connections 157, 170 to D/A convertor 160 to vary the trough position in a sense to reduce the difference between stored and measured value of capacitance at block 124. The value of trough spacing at guage 17 is also supplied from guage 17 over block 154, closed connection 110 to block 156 so that closed loop control is achieved. In general with foamed plastic insulators, with or without a covering skin, the greater and less thr trough spacing, respectively, the smaller and larger the co-axial capacitance. The block 158 is provided by the computer with a stored value for trough spacing and is designed to compare this with the value for trough spacing supplied from block 154 over closed connection 110. The output of block 158 is not however used to correct the trough spacing but is used to increment a stored temperature value (supplied by the computer) for the melt temperature of zone 5 at block 164. The block 164 preferably operates in accord with the same algorithm as blocks 144 and 130 although it of course compares measured and stored zone 5 temperature values. The effect of increased and decreased zone melt temperature is to decrease and increase the coaxial capacitance. The block 164 compares its stored value for zone 5 melt temperature, as incremented by the digital signals from block 158 with the digital signal produced by the thermocouple 145E and converted by A/D converter 162 and supplied over a closed connection 110 to block 164. The resulting output is provided by the block 164 over a closed connection 170 through D/A converter 166 to control the heater 144E. The fed back temperature from thermocouple 145E over elements 162 closed connection 110 to block 164 provides closed loop control for temperature. The melt temperature (here of zone 5) is used in addition to the trough spacing to control the capacitance, to reduce the range of operation of the trough. Thus increase and decrease in melt temperature causes reduction and increases in capacitance as does greater and less trough spacing. Thus the blocks 158, 164, 166, by their effect are used when the measured capacitance is high to increase zone 5 melt temperature and thus reduce the amount of the increased trough spacing and conversely when the measured capacity is low to lower zone 5 melt temperature and hence reduce the amount of the decrease in trough spacing.

The zone 5 melt temperature is found to be a greater factor in determining the capacitance value when the temperature in zones 1–4 and the head of the extruders, and hence zone 5, in the preferred embodiment of the invention, is the zone controlled by the computer. As indicated by the dotted line 171 going downward from the output of block 158, block similar to 164 may compare stored inputs updated from block 158 with inputs from measured temperature values of the zone in question (the next most important would be zones 4 and 3 in that order) and to provide through a A/D converter equivalent to 166 a signal to increase or decrease the temperature of the zone in question.

Accordingly with the controls as discussed, the computer stored values for capstan-speed, extruder RPM, trough spacing and heating many initially be used to bring the line to operating state. In the case of capstan speed and extruder R.P.M., the computer may also be programmed to provide ramp control for bringing these parameters in at a controlled rate or sequence up to operating conditions.

(Computers control of any other parameters may be added by obvious analogy to the relationships shown).

When operating conditions have been achieved (whether under computer control or otherwise) the scan will indicate this and as much of the line may be operated with computer control as desired. Thus capstan speed, extruder RPM may be each operated in accord by the computer in accord with the measured capacitance or the diameter values. The trough spacing and the extruder melt temperatures may be operated in accord with the capacitance measurement. Alternatively some of the parameters listed above may be supervised by the computer while others are operated by the conventional operator supervision and analogue controls. As previously explained a break at a connection 110 is provided when the computer does not exercise control based on the inputs from the corresponding sensors; and for computer control in accord with the sensed values these connections 110 are closed indicating the supply of data from the convertors involved to the computer. Similarly for control of one or more the parameters involved by the computer and connections at 170 to the controlled equipment are closed and where the connections are open the equipment is not controlled by the computer.

I claim:

1. In the provision of plastic insulated wire by apparatus including:
    means for causing wire to travel in a path,
    a control for adjusting the speed of said travel,
    a coating head located on said path,
    a molten plastic extrusion means connected to provide molten plastic to said extrusion head,
    said head being designed to cause the application of a layer of such molten plastic to such wire passing said head,
    a control for the temperature of such molten plastic,
    a control for the extrusion rate,
    cooling means for cooling the plastic coated wire travelling out of said head,
    the spacing between said cooling means and said head being adjustable,
    a control for said spacing,
    means for obtaining an analogue measure of the capacitance of plastic insulated wire formed on said path,
    means for converting said capacitance measure to a digital value representative thereof,
    means for comparing said digital value to a preset capacitance digital value representative of the desired capacitance and obtaining a digital correction value which is a function of such two digital values,
    means actuable by said digital correction value to produce an analogue signal to control said extrusion rate in a sense to reduce the difference between said two digital values.

2. In the provision of plastic insulated wire by apparatus including:
    means for causing wire to travel in a path,
    a control for adjusting the speed of said travel,
    a coating head located on said path,
    a molten plastic extrusion means connected to provide molten plastic to said extrusion head,
    said head being designed to cause the application of layer of such molten plastic to such wire passing said head,
    a control for the temperature of such molten plastic,
    a control for the extrusion rate,
    cooling means for cooling the plastic coated wire travelling out of said head,
    the spacing between said cooling means and said head being adjustable,
    a control for said spacing,
    means for obtaining an analogue a measure of the capacitance of plastic insulated wire formed on said path,
    means for converting said capacitance measure to a digital value representative thereof,
    means for comparing said digital value to a preset capacitance digital value representative of the desired capacitance and producing a digital correction value which is a function of said two digital values,
    means actuable by said digital correction value to produce an analogue signal to control said spacing in a sense to reduce the difference between said two digital values.

3. In the provision of plastic insulated wire by apparatus including:
    means for causing wire to travel in a path,
    a control for adjusting the speed of said travel,
    a coating head located on said path,
    a molten plastic extrusion means connected to provide molten plastic to said extrusion head,
    said head being designed to cause the application of a layer of such molten plastic to such wire passing said head,
    a control for the temperature of such molten plastic,
    a control for the extrusion rate,
    cooling means for cooling the plastic coated wire travelling out of said head,
    the spacing between said cooling means and said head being adjustable,
    a control for said spacing,
    means for obtaining an analogue a measure of the capacitance of plastic insulated wire formed on said path,
    means for converting said capacitance measure to a digital value representative thereof,
    means for comparing said digital value to a preset capacitance digital value representative of the desired capacitance and producing a digital correction value which is a function of said two digital values,
    means actuable by said digital correction value to produce an analogue signal to control such speed of travel in a sense to reduce the difference between said two digital values.

4. In the provision of plastic insulated wire by apparatus including:
    means for causing wire to travel in a path,
    a control for adjusting the speed of said travel,
    a coating head located on said path,
    a molten plastic extrusion means connected to provide molten plastic to said extrusion head,
    said head being designed to cause the application of a layer of such molten plastic to such wire passing said head,
    a control for the temperature of such molten plastic, a control for the extrusion rate, cooling means for cooling the plastic coated wire travelling out of said head, the spacing between said cooling means and said head being adjustable, a control for said spacing, means for obtaining an analogue a measure of the diameter of plastic insulated wire formed on said path, means for converting said diameter measure to a digital value representative thereof, means for comparing said digital value to a preset diameter digital value representative of the desired diameter and producing a digital correction value which is a function of said two digital values, means actuable by said digital correction value to produce an analogue signal to control such speed rate in a sense to reduce the difference between said two digital values.

5. In the provision of plastic insulated wire by apparatus including:

means for causing wire to travel in a path, a control for adjusting the speed of said travel, a coating head located on said path, a molten plastic extrusion means connected to provide molten plastic to said extrusion head, said head being designed to cause the application of a layer of such molten plastic to such wire passing said head, a control for the temperature of such molten plastic, a control for the extrusion rate, cooling means for cooling the plastic coated wire travelling out of said head, the spacing between said cooling means and said head being adjustable, a control for said spacing, means for obtaining an analogue a measure of the diameter of plastic insulated wire formed on said path, means for converting said diameter measure to a digital value representative thereof, means for comparing said digital value to a preset diameter digital value representative of the desired diameter and producing a digital correction value which is a function of said two digital values, means actuable by said digital correction value to produce an analogue signal to control said extrusion rate in a sense to reduce the difference between said two digital values.

6. In the provision of plastic insulated wire by apparatus including:

means for causing wire to travel in a path, a coating head located on said path, a molten plastic extrusion means arranged to supply molten plastic to said extrusion head, said head being designed to cause the application of a layer of such molten plastic to such wire passing said head, means for cooling the plastic coated wire travelling out of said head, means for controlling the speed of said wire travel, means for obtaining an analogue measure of said speed of travel, means for converting such measure of said speed of travel into a digital value representative thereof, means for comparing said digital value with a stored digital value representative of desired line speed, and consequent to said comparison for providing a digital corrective signal for altering said speed to reduce the difference between said stored value and said measured value of line speed, means for converting said corrective digital signal to analogue signal for supply to said speed control means.

7. In the provision of plastic insulated wire as claimed in claim 6 wherein means are provided for starting said wire travel comprising means for supplying digital values to said digital value comparing means for storing thereat which will cause, through such comparison and said resulting analogue signals, the rate of wire travel to increase from 0 velocity to running velocity in accord with a predetermined pattern.

8. In the provision of plastic insulated wire as claimed in claim 6 wherein means are provided for obtaining a measure of the coaxial capacity of insulated wire being produced on said apparatus, means for providing a digital representation of such measure, means for comparing said digital representative with a stored value representative of the desired coaxial capacitance, means operable as a result of such comparison for updating the stored digital value representative of line speed, in a sense to reduce the difference between the measured and stored values of line speed.

9. In the provision of plastic insulated wire as claimed in claim 6 wherein means are provided for obtaining a measure of the diameter of insulated wire produced on said apparatus, means for providing a digital representation of such measure, means for comparing said digital representation with a stored value representative of the desired diameter, means as a result of such comparison for updating the stored digital value representative of line speed in a sense to reduce the difference between the measured and stored values of diameter.

10. In the provision of plastic insulated wire by apparatus including:

means for causing wire to travel in a path, a coating head located on said path, a molten plastic extrusion means arranged to provide molten plastic to said extrusion head, said head being designed to cause the application of a layer of such molten plastic to such wire passing said head, means for cooling the plastic coated wire travelling out of said head, means for controlling the rate of extrusion of plastic by said plastic extrusion means, means for obtaining an analogue measure of said extrusion rate, means for converting such measure of such rate of extrusion into a digital value representative thereof, means for comparing such rate of extrusion digital value with a stored digital value representative of desired extrusion rate, and consequent to said comparison for providing a digital corrective signal for altering said speed to reduce the difference between said stored and measured value of extrusion rate, means for converting said corrective digital signal to an analogue signal for supply to said means for controlling extrusion rate.

11. In the provision of plastic insulated wire as claimed in claim 10 wherein means are provided for starting the supply of said molten plastic comprising means for supplying values to said digital value comparing means for storing thereat which will cause, through such comparison and said resulting analogue signals, the rate of extrusion to increase from 0 to running rate in accord with a predetermined pattern.

12. In the provision of plastic insulated wire as claimed in claim 10 wherein means are provided for obtaining a measure of the coaxial capacity of insulated wire being produced on said apparatus, means for providing a digital representation of such measure, means for comparing said digital representation with a stored value representative of the desired coaxial capacitance, means operable as a result of such comparison, for updating the stored digital value representative of extrusion rate.

13. In the provision of plastic insulated wire as claimed in claim 10 wherein means are provided for obtaining a measure of the diameter of insulated wire being produced on said apparatus, means for providing a digital representation of such measure, means for comparing said digital representation with a stored value representative of the desired diameter means operable, as a result of such comparison, for updating the stored digital value representative of extrusion rate.

14. In the provision of plastic insulated wire by apparatus including:

means for causing wire to travel in a path,
a coating head located on said path,
a molten plastic extrusion means arranged to supply molten plastic to said extrusion head,
said head being designed to cause the application of a layer of such molten plastic to such wire passing said head,
means for cooling the plastic coated wire travelling out of said head,
means for controlling the spacing between said extrusion head and said cooling means,
means for obtaining an analogue measure of the spacing between said extrusion head and said cooling means,
means for converting such measure of said spacing into a digital value representative thereof,
means for comparing said digital value with a stored digital value representative of a deisred value of such spacing,
and consequent to said comparison for providing a digital corrective signal for altering said spacing to reduce the difference between said stored value and said measured value of spacing,
means for converting said corrective digital signal to an analogue signal for supply to said spacing control means,
means for obtaining a measure of the coaxial capacity of insulated wire being produced as said apparatus,
means for providing a digital representation of such measure,
means for comparing said digital representation with a stored value representative of the desired coaxial capacitance,
means operable as a result of such comparison for updating the stored digital value representative of such spacing in a sense to reduce the difference between measured and stored values of coaxial capacitance.

15. In the provision of plastic insulated wire as claimed in claim 14, wherein there are provided,
a control for the temperature of molten plastic supplied to said head,
means for measuring the temperature of plastic supplied to said head,
means for converting a measure of said temperature into a digital value, representative thereof,
means for comparing said temperature measure digital value with a digital value representative of the desired temperature and as a result of such comparison to produce a digital correctional signal for altering said temperature to reduce the difference between said stored value and said measured value of temperature,
means for converting said corrective digital signal to an analogue signal for supply to said temperature control means,
second means for comparing the digital value of said spacing with a stored digital value representative of a desired value of such spacing, and consequent to comparison at said second means for providing a digital corrective signal for updating the stored value of said temperature in a sense to reduce the difference between said digital stored and measured capacitance values.

* * * * *